United States Patent
Fuller et al.

(10) Patent No.: US 10,564,258 B2
(45) Date of Patent: Feb. 18, 2020

(54) ADVANCED IDENTIFICATION TECHNIQUES FOR SECURITY AND SAFETY SYSTEMS

(71) Applicant: UTC Fire & Security Corporation, Farmington, CT (US)

(72) Inventors: Christopher C. Fuller, Bloomington, MN (US); Kimmo Kyllonen, Shakopee, MN (US); Edward Goff, Mahtomedi, MN (US); Corey Running, Apple Valley, MN (US); William L. Schultz, Arden Hills, MN (US); Umer Qureshi, Carlsbad, CA (US); Rene Christian, Brookfield, WI (US)

(73) Assignee: UTC Fire & Security Corporation, Farmington, CT (US)

( * ) Notice: Subject to any disclaimer, the term of this patent is extended or adjusted under 35 U.S.C. 154(b) by 394 days.

(21) Appl. No.: 15/513,639

(22) PCT Filed: Aug. 26, 2015

(86) PCT No.: PCT/US2015/046888
§ 371 (c)(1),
(2) Date: Mar. 23, 2017

(87) PCT Pub. No.: WO2016/057129
PCT Pub. Date: Apr. 14, 2016

(65) Prior Publication Data
US 2017/0299696 A1    Oct. 19, 2017

Related U.S. Application Data

(60) Provisional application No. 62/061,893, filed on Oct. 9, 2014.

(51) Int. Cl.
| | | |
|---|---|---|
| *G01S 7/41* | (2006.01) | |
| *G01S 13/88* | (2006.01) | |
| *G01S 13/66* | (2006.01) | |

(52) U.S. Cl.
CPC .............. *G01S 7/412* (2013.01); *G01S 13/66* (2013.01); *G01S 13/886* (2013.01)

(58) Field of Classification Search
CPC . G01S 7/003; G01S 7/41; G01S 7/412; G01S 13/003; G01S 13/04; G01S 13/56;
(Continued)

(56) References Cited

U.S. PATENT DOCUMENTS

| | | |
|---|---|---|
| 6,166,633 A | 12/2000 | Wang |
| 6,943,682 B1 | 9/2005 | Dowens et al. |

(Continued)

FOREIGN PATENT DOCUMENTS

| | | |
|---|---|---|
| CN | 102894980 A | 1/2013 |
| KR | 20140034364 A | 3/2014 |

(Continued)

OTHER PUBLICATIONS

Office Action dated Dec. 14, 2018 issued in corresponding European Patent Application No. 15760567.6.
(Continued)

*Primary Examiner* — Peter M Bythrow
(74) *Attorney, Agent, or Firm* — Locke Lord LLP; Alicia J. Carroll; Georgi Korobanov

(57) ABSTRACT

A system for characterizing the environment and objects in the environment created by fusing a plurality of sensor data, comprising a plurality of radar sensors each radar sensor integrated into a wireless module. A processor is operatively connected to the plurality of radar sensors and to a memory, wherein the memory includes instructions recorded thereon that, when read by the processor, cause the processor to
(Continued)

combine the sensor data to identify, monitor and characterize the environment and objects within the environment.

17 Claims, 1 Drawing Sheet

(58) Field of Classification Search
CPC ..... G01S 13/87; G01S 13/878; G08B 13/181; G08B 13/189
See application file for complete search history.

(56) References Cited

U.S. PATENT DOCUMENTS

| | | | | |
|---|---|---|---|---|
| 7,257,236 | B2 * | 8/2007 | Yukhin | G06K 9/00201 |
| | | | | 348/135 |
| 7,504,942 | B2 | 3/2009 | Marman | |
| 7,567,200 | B1 * | 7/2009 | Osterweil | A61B 5/1117 |
| | | | | 340/573.1 |
| 7,714,719 | B2 | 5/2010 | Duff | |
| 7,894,305 | B2 | 2/2011 | Sabatier et al. | |
| 7,911,348 | B2 | 3/2011 | Rodgers | |
| 8,144,197 | B2 * | 3/2012 | Broad | G08B 25/009 |
| | | | | 340/506 |
| 8,272,053 | B2 | 9/2012 | Markham et al. | |
| 8,551,026 | B2 | 10/2013 | Alwan et al. | |
| 8,922,371 | B2 * | 12/2014 | Mohamadi | G01S 7/003 |
| | | | | 340/552 |
| 2007/0182618 | A1 * | 8/2007 | Fullerton | G01S 7/003 |
| | | | | 342/28 |
| 2008/0007445 | A1 * | 1/2008 | Leach, Jr. | G01S 13/0209 |
| | | | | 342/21 |
| 2008/0309486 | A1 * | 12/2008 | McKenna | H04W 4/90 |
| | | | | 340/540 |
| 2009/0022362 | A1 | 1/2009 | Gagvani et al. | |
| 2009/0278684 | A1 * | 11/2009 | Petricoin, Jr. | G06K 9/00771 |
| | | | | 340/557 |
| 2010/0148961 | A1 * | 6/2010 | Raphaeli | G01S 5/0289 |
| | | | | 340/552 |
| 2011/0093876 | A1 * | 4/2011 | Belz | G08B 21/0423 |
| | | | | 725/12 |
| 2012/0032834 | A1 | 2/2012 | Weeks | |
| 2012/0299728 | A1 * | 11/2012 | Kirkpatrick | G06Q 10/109 |
| | | | | 340/541 |
| 2012/0313782 | A1 * | 12/2012 | Mohamadi | G01S 7/003 |
| | | | | 340/541 |
| 2013/0021154 | A1 | 1/2013 | Solomon et al. | |
| 2013/0182115 | A1 * | 7/2013 | Willis | H04N 5/33 |
| | | | | 348/155 |
| 2013/0278422 | A1 * | 10/2013 | Friedman | G08B 13/196 |
| | | | | 340/541 |
| 2014/0070947 | A1 | 3/2014 | Ionson | |

FOREIGN PATENT DOCUMENTS

RU          2008131045 A     2/2010
WO    WO-2011061767 A1     5/2011

OTHER PUBLICATIONS

PCT International Search Report and Written Opinion dated Nov. 16, 2015 issued during the prosecution of corresponding PCT International Patent Application No. PCT/US2015/046888 (14 pages).

* cited by examiner

ADVANCED IDENTIFICATION TECHNIQUES FOR SECURITY AND SAFETY SYSTEMS

CROSS-REFERENCE TO RELATED APPLICATIONS

This application is a 35 U.S.C. § 371 National Phase Application of PCT International Patent Application No. PCT/US2015/046888, filed Aug. 26, 2015, which claims the benefit of U.S. Provisional Patent Application Ser. No. 62/061,893 filed Oct. 9, 2014. The content of each application is expressly incorporated by reference herein in its entirety.

2. FIELD OF THE INVENTION

The present disclosure relates to security and safety systems, and more particularly to monitoring subjects using security and safety systems.

3. DESCRIPTION OF RELATED ART

Typical security systems employ sensors and processors looking at differences between a current sensed environment and a previous sensed environment. If a change in the environment exceeding a predetermined threshold is detected, an event is recognized. This event could create an alarm condition or trigger other actions. Some existing systems include sensors to capture biometric data of people entering and leaving the premises. Generally, traditional alarm systems are designed to trigger an alarm if anyone enters or exits the field of view of the system.

Such conventional methods and systems have generally been considered satisfactory for their intended purpose. However, there is still a need in the art for improved systems and methods for identifying and tracking subjects using security systems. The present disclosure provides a solution for this need.

SUMMARY OF THE INVENTION

A system for identifying and tracking the environment and objects in the environment by fusing a plurality of sensor data, including a plurality of radar sensors each radar sensor integrated into a wireless module. The system may further include a receiver for wirelessly receiving real-time sensor data from each of the radar sensors. A processor is operatively connected to the receiver and to a memory, wherein the memory includes instructions recorded thereon that, when read by the processor, cause the processor to combine the sensor data to characterize and track the environment of the plurality of sensors.

The plurality of radar sensors can alternate between an active mode and a passive mode. In addition, the plurality of radar sensors can be configured to receive reflections from the environment from a wireless communication signal transmitted from the wireless module. The plurality of radar sensors can be configured to transmit radar signals when the wireless module is not transmitting a wireless communication signal. The wireless module can transmit on a first radio frequency and the plurality of radar sensors can transmit on additional radio frequencies such that the transmissions do not interfere with each other.

A method for identifying and tracking an individual in the environment includes receiving data of a detected object from the system as described above. The detected object is classified as an approved subject responsive to determining from the data that the detected object corresponds to an approved identity or if the object acts in a way (secret gestures, voice/keypad code, etc.) which indicates they or another individual (e.g., a guest) are authorized. Otherwise the detected object is classified as an unapproved subject. One or more actions may be taken, including prompting for further identification authentication, sounding an alarm, closing a door, etc. One or more actions are activated if the detected object is classified as an unapproved subject. One or more actions are also activated if the detected object is classified as an approved subject engaged in unauthorized activity.

Detecting the approved subject engaged in the unauthorized activity can include tracking the location of the approved subject within the field of view and range of the sensors. Whether the detected object is an approved subject can be determined by comparing the data with a plurality of approved identities stored as a reference database or the actions of the subject as described above.

The sensor can be awakened from a sleep mode upon detecting movement from the detected subject or potential subject. Further, upon classification of an approved subject the sensor and system can be awakened from a sleep mode.

The approved subject and unauthorized activity can be defined differently for different classes of individuals. For example, the approved subject can include a minor and the unauthorized activity can include the minor exiting the range or field of view of the sensor. The unauthorized activity can also include the minor entering a restricted space without adult supervision, for example, a kitchen of a residential home. The unauthorized activity can further include the minor exiting an approved space. The unauthorized activity may further include lack of motion of a subject and other indications for an extended period of time potentially indicating an incapacitated subject.

In another example, the approved subject can be a patient at a hospital wherein the unauthorized activity can include the patient exiting the field of view of the sensor, e.g., leaving the hospital or ward.

A security system includes at least one sensor and an alarm. The system further includes a processor electronically coupled to the at least one sensor and the alarm. The processor is operatively connected to a memory, wherein the memory includes instructions recorded thereon that, when read by the processor, cause the processor to receive sensor data from a sensor indicating a detected object. The processor also classifies the detected object as an approved subject responsive to determining from the data that the detected subject corresponds to an approved identity or if the object acts in a way which authorizes them wherein the approved subject is monitored to detect unauthorized activity. Otherwise the detected object is classified as an unapproved subject. One or more actions are activated if the detected object is classified as an unapproved subject. One or more actions are also activated if the detected object is classified as an approved subject engaged in unauthorized activity.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
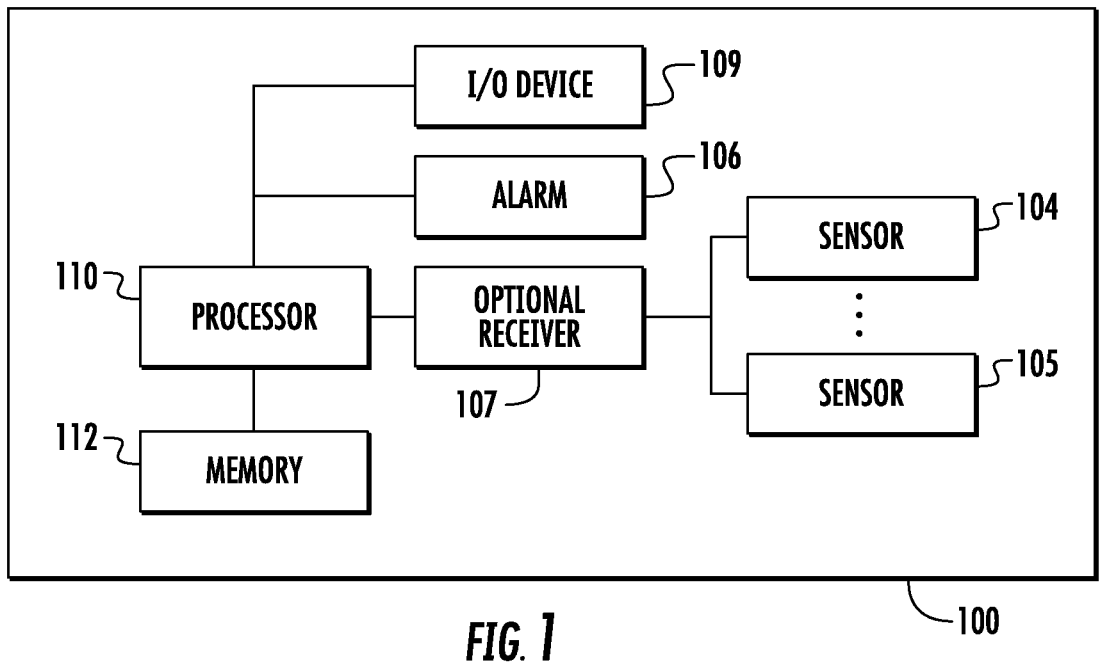
FIG. 1 is a schematic view of an exemplary embodiment of a system constructed in accordance with the present disclosure, showing a security system with a sensor and alarm for identifying and monitoring the environment and individuals.

Reference will now be made to the drawings wherein like reference numerals identify similar structural features or aspects of the subject disclosure. For purposes of explanation and illustration, and not limitation, a partial view of an exemplary embodiment of a system for identifying and tracking the environment and objects in the environment in accordance with the disclosure is shown in FIG. 1 and is designated generally by reference character 100. Other embodiments of the system and method in accordance with the disclosure, or aspects thereof, are provided in FIG. 2, as will be described.

The present disclosure provides a means for advanced protection in an environment by combining detection features of sensors in security and safety systems. More specifically, as shown in FIG. 1, using a plurality of sensors 104, 105 the system 100 can identify, classify and monitor objects within the field of view of the system 100. The ellipses shown in FIG. 1 indicate that while two sensors 104 and 105 are shown and described, any suitable number of sensors can be included. Sensors 104, 105 can include a video camera that can be used individually or in combination with other sensors to detect and identify objects. The system 100 may include an alarm 106. The alarm can be any type of device known in the art to provide warning which may include audio and/or visual warning or a silent alert to a security monitoring system. The sensors 104, 105 detect an object, e.g., a person, within the range and field of view of the sensors 104, 105. Sensors 104, 105 may also identify non-human objects in order to characterize the environment. Identifying the environment improves the probability of identifying the object.

Further, combining data from multiple sensors improves the quality and speed at which the environment is characterized and the object is identified.

Sensors 104, 105 are wireless (Wi-Fi) transceiving devices and can be either in an active or passive mode. Sensors 104, 105 can include cell phones, Bluetooth devices, or the like. In an active mode, sensors 104, 105 can continually transmit a signal to search the environment and objects within the vicinity of the system 100. By listening to the reflections from the transmitted signal, the sensors 104, 105 can detect whether an object is in the range or field of view of the sensors 104, 105. In a passive mode, sensors 104, 105 can use electromagnetic energy from other electronic systems and transmitters to detect the environment or when an object is in the vicinity of the system. For example, sensors 104, 105 can incorporate a radar. The radar would operate in a non-interfering manner with the WiFi module on the same radio frequency bands. For the active mode, when the WiFi module is transmitting, the radar subsystem within the WiFi module listens to the transmitted WiFi signal during transmission and after the WiFi signal reflects from the environment in order to detect the environment and objects.

In another embodiment of the active mode, when the WiFi module is not transmitting, the radar receiver subsystem may transmit signals ideally suited for radar detection purposes and listen for the reflections of the transmitted radar signal from the environment and objects.

In another embodiment, the WiFi may be transmitting/ utilizing one radio frequency channel and the radar may be simultaneously transmitting on another radio frequency channel. In this way, both systems are transmitting at the same time, but frequency multiplexed so they do not interfere with each other. The radar receiver could be designed to receive only the intentional radar signal or it could be designed to receive the WiFi signal and the radar signal in order to improve the quality of the identification of the environment.

In another embodiment, when the WiFi module is not transmitting (i.e. passive mode), the radar receiver subsystem will listen to WiFi and/or radar transmissions from transmitters (e.g. other sensors) which may or may not be part of the security system.

A variety of algorithms may be used to process the radar signals into a characterization of the environment and object detections, including, tomography, MIMO radar, Synthetic Aperture Radar (SAR) processing techniques and other techniques applied individually or in combination. Tracking may use a variety of methods, including simple Kalman filter, modified Kalman filter, or the like.

In another embodiment of the sensors 104, 105 can include a cell phone module that will incorporate a radar. The radar would operate in a non-interfering manner with the cell phone module on the same radio frequency bands. For a cell phone module which incorporates a radar, the radar would primarily operate in passive (i.e. listen only) mode. The raw data or characterizing results of the radar could be combined with the data from the WiFi module/ radar to increase the quality of the characterization of the environment and detected objects.

In another embodiment of the proposed sensors 104, 105, a Bluetooth module would incorporate a radar. The radar would operate in a non-interfering manner with the Bluetooth module on the same radio frequency bands. For a Bluetooth module which incorporates a radar, the radar could primarily operate in passive (i.e. listen only) or active (i.e. transmit & receive) modes similar to a WiFi module/ radar. The raw data or characterizing results of the radar could be combined with the data from the WiFi module/ radar to increase the quality of the characterization of the environment and detected objects.

In another embodiment of the proposed sensors 104, 105, a 433 MHz, 868 MHz, 915 MHz, 2.4 GHz, 60 GHz, 77 GHz or other licensed or unlicensed band module would incorporate a radar. The radar would operate in a non-interfering manner with the licensed or unlicensed band module on the same radio frequency bands. For an unlicensed band module which incorporates a radar, the radar could operate in passive (i.e. listen only) or active (i.e. transmit & receive) modes similar to a WiFi or cell phone module/radar. The raw data or characterizing results of the radar could be combined with the data from the WiFi module/radar and other radars to increase the quality of the characterization of the environment and detected objects.

In another embodiment of the proposed sensors 104, 105, a 319 MHz or other security band module would incorporate a radar. The radar would operate in a non-interfering manner with the security band module on the same radio frequency bands. For a security band module which incorporates a radar, the radar could primarily operate in passive (i.e. listen only) or active (i.e. transmit & receive) modes similar to a WiFi module/radar. The raw data or characterizing results of the radar could be combined with the data from the WiFi module/radar and other radars to increase the quality of the characterization of the environment.

Further, when sensors 104, 105 are in a passive mode, system 100 could be in a sleep mode such that the system 100 is awakened when a sensing event is detected. Regardless of the sensors 104, 105 operating in a passive or active mode, once movement within the vicinity of a system is detected, the sensors 104, 105 starts processing, transmitting and possibly recording sensor data.

With continued reference to FIG. 1, system 100 may include a receiver 107 operatively connected to the sensors 104, 105 for receiving sensor data. A processor 110 is operatively connected to the receiver 107 and alarm 106. In addition, processor 110 is connected to a memory 112 that includes instructions recorded thereon that, when read by the processor 110, cause the system 100 to receive data from the receiver 107. The processor 110 then processes and classifies the data received of the detected environment and objects. In order to classify the data, processor 110 compares the fused sensor data of the detected object to reference data stored in a database. Using biometrics, e.g., facial recognition, processor 110 searches the database to determine if the detected object corresponds to a subject saved in the database. If a match is found, the processor 110 acknowledges the detected object is an approved identity. In other words, the detected object is an individual recognized by the system 100 with access to the designated area. For example, system may be set up in a residential home with minor children. When a child is crawling or walking within the home, sensor of system recognizes the child and processor classifies him or her as an approved identity. In another example, the system can be used as a security system for a playground of a school where the system recognizes and identifies multiple children playing at one time. The timeframe of classifying an object once the sensor detects an object may vary depending on a variety of factors, including processing power, the sensor type and the orientation of the object.

Those skilled in the art will recognize that the processor 110 is only illustrative of various possible combinations of hardware. For example, processor 110 may comprise a single processing unit, or be distributed across one or more processing units in one or more locations, such as on a client, server or in the sensors. Similarly, memory 112 can comprise any combination of various types of data storage and/or transmission media that reside at one or more physical locations, including input/output (i.e. I/O) interfaces for exchanging information with one or more I/O devices 109 that provide an interface with one or more other computing devices (e.g. network adapter, I/O port, modem, wireless datalink, etc.) and/or users (e.g. keyboard, pointing device, display, etc.) It is understood, however, that if a processor 110 comprises a hand-held device or the like, one or more I/O devices 109 (e.g. display) and/or memory 112 could be contained within the device and not shown.

Once system 100 detects an approved subject, system 100 will continually track the subject as it moves within the range and field of view of the system 100. System 100 will monitor the activity of the subject and perform one or more actions if the approved subject is performing an unauthorized activity. Using the example of the system installed in a residential home, the system will continually monitor the whereabouts of the minor child. If the minor child enters a room he or she is not allowed to be in without an adult, e.g., the kitchen, or exits the home through the front door without an adult, the processor 110 signals one or more actions to be performed. In this example, sensors 104, 105 can be positioned at the alarm panel and/or at the entrance of the kitchen to detect movement as an individual enters or exits. Sensors 104, 105 can also be positioned at the front door detecting when the door is opened or closed. In this manner, system 100 not only identifies an individual, but includes sensors to augment location tracking of the individual to provide added safety, protection and real-time alarm warning if the subject, e.g., minor child, is performing an unauthorized activity, e.g., exiting the home. In another example, system 100 can be used to detect and identify pets or animals in addition to humans, for example, to prevent a false alarm when a family pet is within the home.

In addition to monitoring detected objects, if the processor 110 is unable to match data of the detected object with data stored in the reference database, the system 100 will perform one or more actions to warn of an unauthorized subject, e.g., sounding an alarm 106. Therefore, the system 100 also provides additional security when an unrecognized individual is within the field of view of the system 100.

The system 100 can perform multiple actions when either an approved subject is conducting an unauthorized activity or an unapproved subject is detected. The system may, for example, sound the alarm, sound a verbal warning, send a message via multiple channels to a security monitoring company, send a message and/or contact the owner of the property, turn on/off lights, or any other notification technique. In addition, an action can comprise any operation performed by system 100. For example, an action can comprise initiating communications with another computing device. These communications can comprise providing commands to control the computing device, providing data for processing and/or display by the computer device, storage of the data at a remote computing device, etc. Further, system 110 can perform other actions such as activating an I/O device to signal an alarm, initiating operation of/communication with another system, adjusting operation of a sensor 104, altering modes of operation, etc.

Figure 2:
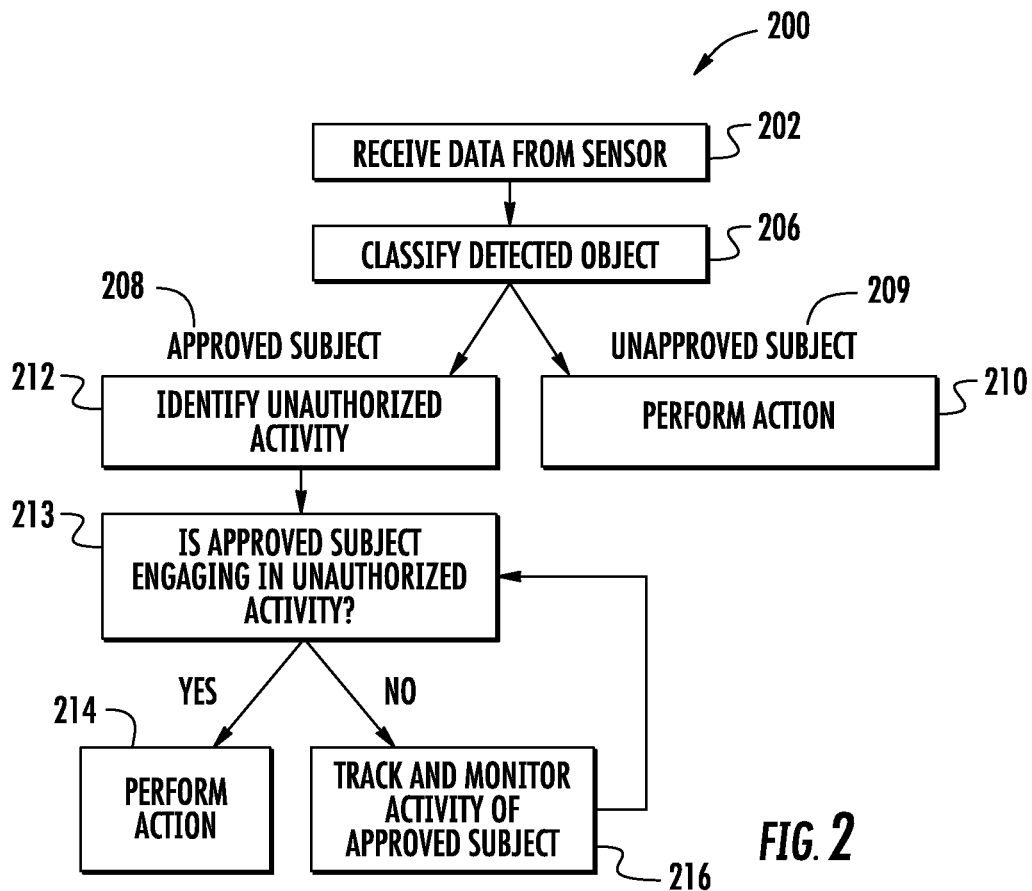
FIG. 2 is a flow chart of an exemplary embodiment of a method in accordance with the present disclosure, showing identifying and classifying objects.

With reference to FIG. 2, a method 200 using an exemplary embodiment of system 100 is shown. As shown in box 202 sensor, e.g. sensor 104, detects movement and/or a presence of a detected object within the sensing range and field of view of the system 100. Next, at box 206, a processor, e.g. processor 110, classifies the detected object by comparing the object to reference data stored in a database. If the object detected by the sensor(s) corresponds to a subject in the database, then the processor classifies the detected object as an approved subject, as shown at step 208. If the sensor data does not correspond to reference data in the database or if the detected object is predetermined as unapproved, the processor labels the detected object as an unapproved subject, as shown in step 209 and performs one or more actions, as shown in box 210, to warn of an unapproved subject, i.e., an intruder. The action performed may depend upon the class of subject detected. For example, a minor entering the kitchen may cause a different action than an intruder entering a home.

On the other hand, if the processor classifies the detected object as an approved identity, the system identifies at least one unauthorized activity, at box 212. The system continually tracks and monitors the approved identity, as shown in box 216, as it moves within the field of view of the system. If the approved identity engages in the unauthorized activity, as shown in box 213, the processor also performs one or more actions as shown in box 214, to provide additional security and warn others of the unauthorized activity in real time.

The methods and systems of the present disclosure, as described above and shown in the drawings, provide for advanced techniques in security systems for with superior properties including identifying and tracking individuals and the environment. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for providing an identity created by fusing a plurality of sensor data, the system comprising:
   a plurality of radar sensors each radar sensor integrated into a wireless module;
   a receiver for wirelessly receiving real-time sensor data from each of the radar sensors; and
   a processor operatively connected to the receiver and to a memory, wherein the memory includes instructions recorded thereon that, when read by the processor, cause the processor to:
      combine the sensor data to characterize the environment of the plurality of sensors wherein characterizing includes classifying a detected object as an approved subject responsive to determining from the sensor data that the detected object corresponds to an approved identity, otherwise classifying the detected object as an unapproved subject.

2. The system of claim 1, wherein the plurality of radar sensors alternate between an active mode and a passive mode.

3. The system of claim 1, wherein the plurality of radar sensors are configured to receive environment reflections from a wireless communication signal transmitted from the wireless module.

4. The system of claim 1, wherein the plurality of radar sensors are configured to transceive radar signals when the wireless module is not transmitting a wireless communication signal.

5. The system of claim 1, wherein the wireless module transmits on a first radio frequency and the plurality of radar sensors transmit on a second radio frequency.

6. The system of claim 1, wherein the wireless module transmits on a first radio frequency and the plurality of radar sensors transmit on a plurality of radio frequencies different from the first radio frequency.

7. The system of claim 1, wherein the receiver is designed to receive signals from the plurality of sensors and a signal from the wireless module.

8. A method for identifying and tracking an individual, comprising:
   receiving data of a detected object from the system of claim 1;
   classifying the detected object as an approved subject responsive to determining from the data that the detected object corresponds to an approved identity, otherwise classifying the detected object as an unapproved subject;
   monitoring the approved subject to detect unauthorized activity;
   performing one or more actions when the approved subject is engaged in the unauthorized activity; and
   performing one or more actions when the detected object is classified as an unapproved subject.

9. The method of claim 8, wherein monitoring further comprises monitoring movement of the approved subject within the range and field of view of the plurality of sensors.

10. The method of claim 8, wherein an approved subject is determined based on comparison between the combined sensor data and a plurality of profiles of biometrically approved identities stored as a database.

11. The method of claim 8, wherein the plurality of sensors are awakened from a sleep mode upon detecting movement from the detected subject.

12. The method of claim 8, wherein performing one or more actions is dependent on a classification of the approved or unapproved subject.

13. A security system, comprising:
    a plurality of radar sensors each radar sensor integrated into a wireless module;
    an alarm; and
    a processor operatively coupled to the plurality of radar sensors and the alarm, the processor operatively connected to a memory, wherein the memory includes instructions recorded thereon that, when read by the processor, cause the processor to:
       receive sensor data from the plurality of sensors and combine the sensor data to indicate a detected object;
       classify the detected object as an approved subject responsive to determining from the data that the detected object corresponds to an approved identity, otherwise classifying the detected object as an unapproved subject;
       monitor the approved subject to detect unauthorized activity;
       activate the alarm when the approved subject is engaged in the unauthorized activity; and
       activate the alarm when the detected object is classified as an unapproved subject.

14. The system of claim 13, further comprising a receiver for wirelessly receiving real-time sensor data from each of the radar sensors wherein the processor is operatively coupled to the receiver.

15. The method of claim 13, wherein the processor is further configured to track and monitor movement of the approved subject within the range and field of view of the sensor.

16. The system of claim 13, wherein an approved subject is determined based on comparison between the processed sensor data and a plurality of profiles of approved identities stored as a database.

17. The system of claim 13, wherein the unauthorized activity includes audible comments, gestures, motions or lack of motion for an extended period of time.

* * * * *